United States Patent
Ramalho

(10) Patent No.: US 11,070,941 B2
(45) Date of Patent: Jul. 20, 2021

(54) SYSTEMS AND METHODS FOR PROVIDING PROXIMITY AS A SERVICE IN A HETEROGENEOUS NETWORK OF INDEPENDENT SYSTEM COMPONENTS

(71) Applicant: Cisco Technology, Inc., San Jose, CA (US)

(72) Inventor: Michael A. Ramalho, Lakewood Ranch, FL (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/510,177

(22) Filed: Jul. 12, 2019

(65) Prior Publication Data

US 2021/0014639 A1    Jan. 14, 2021

(51) Int. Cl.
*H04W 4/00* (2018.01)
*H04W 4/02* (2018.01)
*H04W 12/08* (2021.01)

(52) U.S. Cl.
CPC .......... *H04W 4/023* (2013.01); *H04W 12/08* (2013.01)

(58) Field of Classification Search
CPC ................. H04W 12/08; H04W 4/029; H04W 12/00503; H04W 12/0401
See application file for complete search history.

(56) References Cited

U.S. PATENT DOCUMENTS

| 9,037,133 | B2 | 5/2015 | Yang et al. |
| 9,374,699 | B2 | 6/2016 | Liao |
| 9,432,960 | B2 | 8/2016 | Liao |
| 10,464,529 | B1* | 11/2019 | Zhang ............... G07C 9/00896 |
| 10,615,394 | B2 | 4/2020 | Miyawaki |
| 2011/0258257 | A1 | 10/2011 | Previdi |
| 2015/0180857 | A1* | 6/2015 | Schulman ........... H04L 63/0807 726/9 |
| 2016/0352751 | A1* | 12/2016 | Perrufel ............... H04W 12/50 |
| 2018/0375855 | A1* | 12/2018 | Karaila .................. H04W 4/40 |

* cited by examiner

*Primary Examiner* — Omoniyi Obayanju
(74) *Attorney, Agent, or Firm* — Polsinelli PC

(57) ABSTRACT

Provided is a heterogeneous network of independently provided system components for detecting and verifying time and location of endpoints. In one aspect, a method includes receiving, at a first network component and from a second network component, a set of instructions for generating tokens in association with an application service; generating, at the first network component, the tokens based on the set of instructions; transmitting, by the first network component and according to the set of instructions, one or more of the tokens to one or more proximity emitter devices; receiving, from a user device, a message including a token received by the user device from at least one of the one or more proximity emitter devices; and validating the token to confirm that the token is from among the tokens generated by the first network component, the validation allowing the user device access to the application service.

20 Claims, 4 Drawing Sheets

SYSTEMS AND METHODS FOR PROVIDING PROXIMITY AS A SERVICE IN A HETEROGENEOUS NETWORK OF INDEPENDENT SYSTEM COMPONENTS

TECHNICAL FIELD

The present technology pertains to systems and methods for detecting and verifying time and location information of endpoints and more specifically to a heterogeneous network of independently provided system components implementing the same.

BACKGROUND

Location services are becoming ubiquitous in society. Personal computing devices utilize GPS to offer services to social networks and navigation applications; automobiles offer proximity-based functionality, such as unlocking the vehicle; and mobile wallets make use of short-range magnetic fields to offer easy transactions. These are only a few examples of location-based services. While these location services have proven useful to consumers, they are not always paired with validation mechanisms ensuring the time and place of a device and its user.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
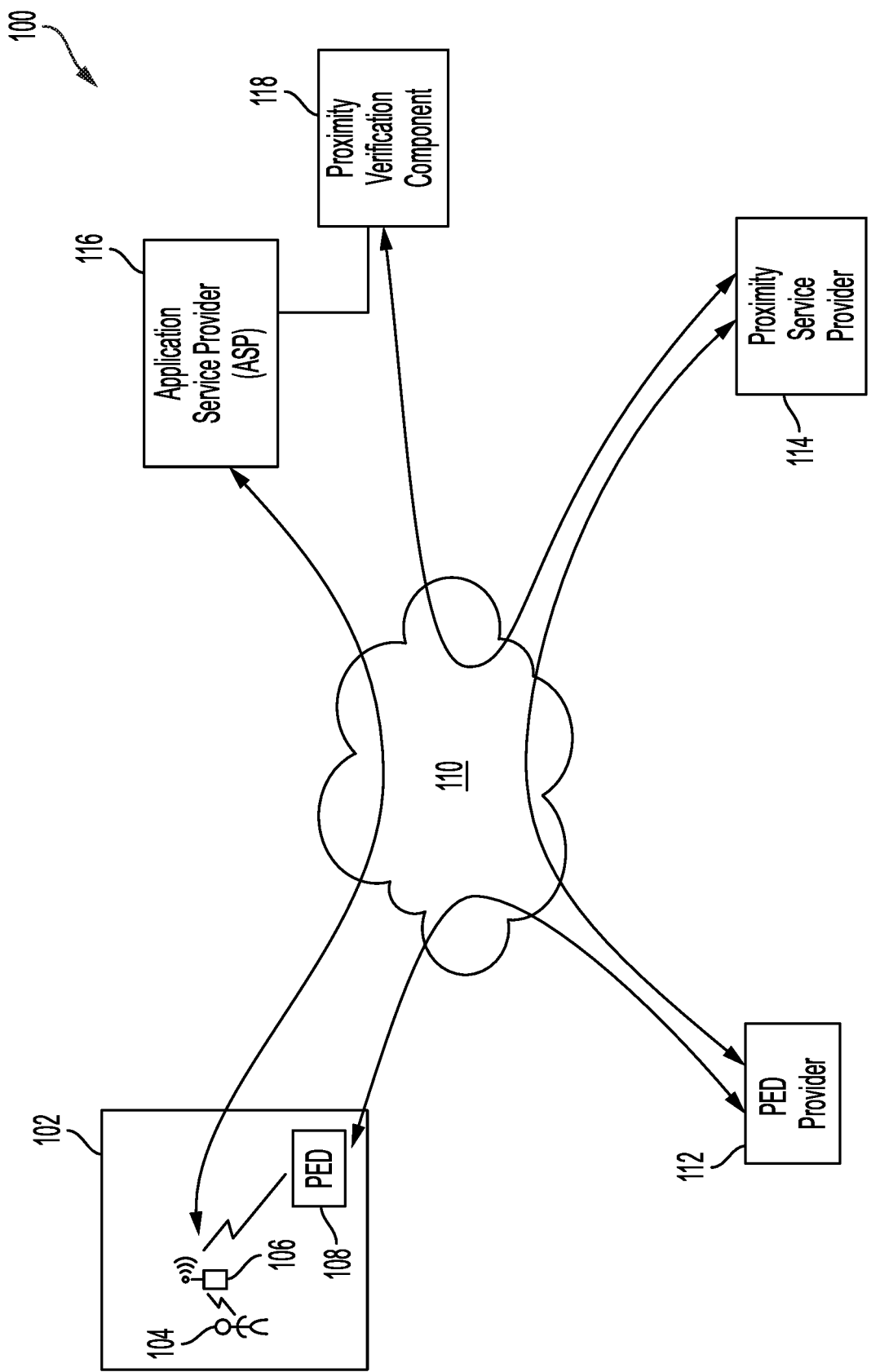
FIG. 1 illustrates an example proximity-as-a-service system in accordance with an aspect of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

The present technology pertains to a heterogeneous network of independently provided system components implementing the creation and use of tokens transmitted between devices to verify the time and place of a device. The system includes a set of specifications for creating tokens for using an application, generation of the tokens, transmission of the tokens from a proximity emitter device to a user device, reception of the tokens by the user device, and validation of the tokens allowing the user access to the application. The set of specifications for creating and using tokens may be dynamic and change depending on specific application requirements.

In one aspect, a method includes receiving, at a first network component and from a second network component, a set of instructions for generating tokens in association with an application service; generating, at the first network component, the tokens based on the set of instructions; transmitting, by the first network component and according to the set of instructions, one or more of the tokens to one or more proximity emitter devices; receiving, from a user device, a message including a token received by the user device from at least one of the one or more proximity emitter devices; and validating, by the first network component, the token to confirm that the token is from among the tokens generated by the first network component, the validation allowing the user device access to the application service.

In one aspect, a system includes one or more proximity emitter devices; an application service provider configured to provide an application service to one or more user devices; and a network component configured to receive, from the application service provider, a set of instructions for generating tokens in association with the application service; generate the tokens based on the set of instructions; transmit, according to the set of instructions, one or more of the tokens to the one or more proximity emitter devices; receive, a user device, a message including a token received by the user device from at least one of the one or more proximity emitter devices; and validate the token to confirm that the token is from among the tokens generated by the network component, the validation allowing the user device access to the application service.

In one aspect, one or more non-transitory computer-readable media includes computer-readable instructions, which when executed by one or more processors of a first network component, configure the first network component to receive, and from a second network component, a set of instructions for generating tokens in association with an application service; generate the tokens based on the set of instructions; generate, according to the set of instructions, one or more of the tokens to one or more proximity emitter devices; receive, from a user device, a message including a token received by the user device from at least one of the one or more proximity emitter devices; and validate the token to confirm that the token is from among the tokens generated by the first network component, the validation allowing the user device access to the application service.

DETAILED DESCRIPTION OF EXAMPLE EMBODIMENTS

The disclosed technology addresses the need in the art for validated location services. It provides a heterogeneous network of independently provided system components that use a system of token generation, emission and validation to determine time and location of any given endpoint device (user device). This token based technology may be referred to as a "Proximity As A Service" (PAAS) technology. PAAS technology has numerous applications such as in home/building security systems, public transit systems, places of public gathering and more generally to any type of application, where knowledge of time of presence and location information of endpoints is useful, be it for security purposes, data gathering for marketing purposes, etc. The disclosure begins with a description of a non-limiting example system in which the PAAS technology may be implemented FIG. 1 illustrates an example proximity-as-a-service system in accordance with the present technology. As shown in FIG. 1, setting 100 includes several non-limiting components. For example, setting 100 includes a location 102 in which one or more users such as user 104 with associated endpoint devices 106 (hereinafter endpoint 106) may be present. Furthermore, location 102 may include one or more Proximity Emitter Devices (PEDs) such as PED 108.

Location 102 may be any indoor and/or outdoor location in which one or more PEDs 108 may be installed. Non limiting examples of location 102 may be a building, a stadium, an elevator, a community entrance gate, a room in a building, a public transit vehicle or station, etc.

Endpoint (user device) 106 may be any type of known or to be developed device capable of establishing short range communication with other nearby devices such as PED 108 as well as any known or to be developed device capable of establishing wired and/or wireless communication with other devices over a private network, internet, etc. such as internet 110. Non-limiting examples of endpoint 106 include a mobile device, a tablet, a laptop, a pager, a personal digital assistant (PDA), etc.

PED 108 may be any type of known or to be developed device that is capable of emitting known or to be developed tokens for detection by nearby devices. Examples of such tokens include, but is not limited to, an ultrasound token. Non-limiting examples of PED 108 include, but is not limited to, a sensor, a camera, a mobile phone, a stationary phone, an access point, a monitor, a laptop, a buzzer and/or any other type of device capable of being controlled/configured by remote controllers over internet or private network 110 and is capable of emitting tokens such as ultrasound tokens for detection by nearby devices such as endpoint 106.

Setting 100 further includes Proximity Emitter Device Provider (PED provider) 112. PED provider may be a manufacturer of PED 108. For example, if PED 108 is a camera, PED provider 112 is a manufacturer of that camera. PED provider 112 may communicate, periodically or on a as needed basis, with PED 108 over internet 110 to configure PED 108 with instructions to enable PED 108 to emit tokens such as ultrasound tokens, update software of PED 108, change security parameters, etc.

Setting 100 further includes proximity service provider 114 (which may also be referred to as PAAS provider 114). PAAS provider may be an entity that provides necessary software/open source instructions for implementation of PAAS. For example Cisco Technology, Inc. of San Jose, Calif. can be a PAAS provider, which can license to or partner with PED provider 112 in order to allow PED provider 112 to configure PED 108 to emit tokens for implementing PAAS technology. Proximity service provider may communicate with PED provider 112 over internet 110 to provide necessary software/open source instructions to PED provider 112.

Setting 100 further includes an Application Service Provider (ASP) 116. ASP 116 may be an independent service provider that provides user 104 with an application to use. ASP 116 can, for example, be a social media application provider with a particular application that can be downloaded and used on endpoint 106 by user 104.

Setting 100 may further include a proximity verification component 118 (which may also be referred to as PAAS Functionality 118). ASP 116 may be associated with proximity verification component 118. ASP 116 and proximity verification component 118 may be operated and owned by ASP 116. As will be described below, proximity verification 118 is responsible for authenticating tokens heard by endpoint 106 (from PED 108) and communicated to ASP 116 over internet 110.

Proximity verification component 118 may receive specifications and parameters for token generation and validation. For example, depending on the type and requirement of an application on endpoint 106, duration of validity of a token may be different or distance requirements (e.g., how close should endpoint 106 be to PED 108 for the emitted token to be detected by endpoint 106 (detection range)) may be different. Such varied specifications and parameters may result in different encoding and decoding algorithms needed. For example, depending on the type of underlying application, endpoint 106 may need to implement a unique decoding process for decoding an emitted ultrasound token received via PED 108.

In view of this dynamic change in parameters, specifications and needed encoding and decoding mechanisms, the source code for PAAS may need to be modified. That is proximity service provider 114 may need to customize and modify token generation, emission, decoding and verification instructions depending on the particular application PAAS is being used in. Therefore, in one example, upon receiving specifications and parameters for token generation and validation, proximity verification component 118 may communicate with proximity service provider 114 to receive customized software instructions/code for PAAS implementation.

As will be described below, proximity service provider 114 may communicate the modifications to ASP 116 and/or alternatively to PED provider 112 for communication to PED 108, which can in turn emit correct tokens (e.g., tokens detectable in specified range, having a specified signal strength with valid duration, etc.).

While certain example components of setting 100 are described above with reference to FIG. 1, the present disclosure is not limited to only setting 100 and with only the described components. Setting 100 may include more components than shown in and described in relation to FIG. 1. For example, there may be more than one ASP 116, each of which provides a different application to endpoint 106 for use. Each such ASP 116 may have different applications, each of which with different specifications and parameters for implementing PAAS. Each such ASP 116 may have a separate associated proximity verification component 118 or alternatively may all be associated with a single proximity verification component 118.

Furthermore, location 102 may have more than one PED 108, each of which may be provided by a different PED provider 112. In such case, setting 100 may include more than one PED 112.

In example setting 100, different components may be provided and operated by different entities. For example, PED 108 and PED provider 112 may be different than provider of ASP 116, proximity verification component 118 and/or proximity service provider 114. However, the present disclosure is not limited thereto. For example, proximity service provider 114 may be provider and operated by same entity as PED provider 112 and PED 108.

With an example setting 100 for implementing PAAS technology, the disclosure now turns to an example method of implementing PAAS technology for any given underlying application. While different functionalities and steps of FIG. 2 will be described from perspective of one of the components of setting 100 of FIG. 1, it should be understood that each such component may have one or more memories having computer-readable instructions stored therein, which when executed by one or more associated processors, cause the one or more associated processors to implement the corresponding functionality.

Figure 2:
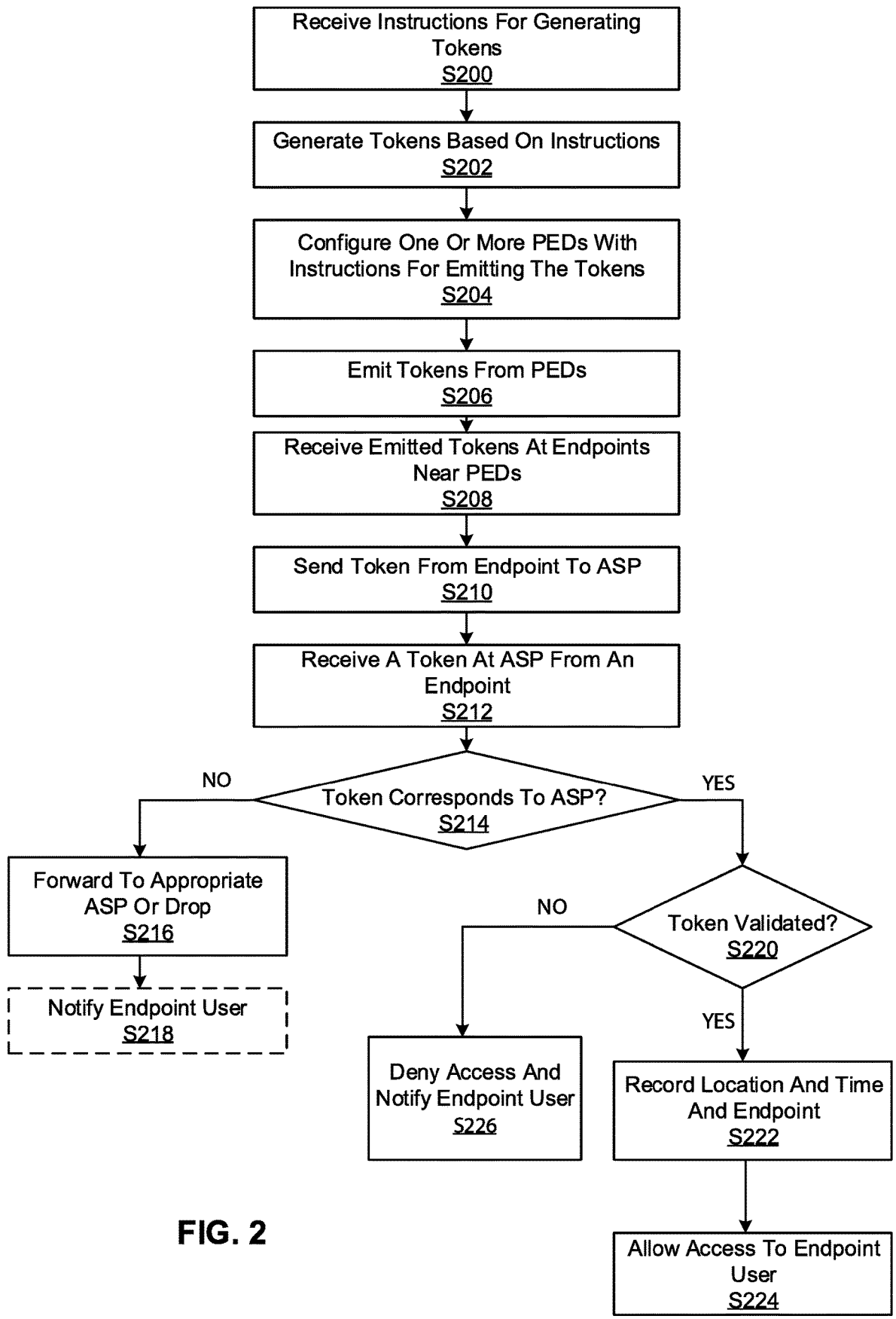
FIG. 2 illustrates an example method for implementing proximity as a service technology, in accordance with an aspect of the present disclosure.

FIG. 2 illustrates an example method for implementing proximity as a service technology, in accordance with an aspect of the present disclosure.

As S200, proximity verification component 118 (first network component) receives instructions for generating tokens for PAAS. In one example, such instruction may be received from ASP 116 (second network component) based on specifications and parameters associated with the type of application being provided for ASP 116. For example, ASP 116 may provide an application to endpoint 106 to allow user 104 access to a secure area. Accordingly, there may be a range specification, within which endpoint 106 must be detected in order to allow access to user 104. Similarly, the security requirement may be such that new tokens must be generated every 10 seconds for example, whereas in another application with less security sensitivity, the range may be more and the duration for generation of tokens may be longer.

At S202, proximity verification component 118 generates tokens based on the received instructions. There may be multiple sets of instructions, in which case the proximity verification component 118 will generate separate sets of tokens, each corresponding to one set of instructions. For example, there may be different sets of instructions for tokens corresponding to different secure areas. In another example, there may be multiple ASPs such as ASP 116 providing applications and services utilized by endpoint 106. Alternatively, ASP 116 may provide multiple services to endpoint 106 and each service may have its own corresponding set of instructions.

At S204, one or more PEDs 108 are configured with instructions for emitting the tokens. One or more PEDs 108 may receive these instructions from proximity validation component 118 (e.g., indirectly via proximity service provider 114 and/or PED provider 112). A single PED 108 may be configured with instructions for emitting multiple token sets, where each set corresponds to a different set of instructions, as described above.

At S206, PED 108 emits tokens according to the corresponding instructions for reception by nearby endpoints such as endpoint 106. As noted above, such tokens may be ultrasound tokens.

At S208, endpoint 106 receives a token emitted by PED 108 (assuming endpoint 106 is within a corresponding required range of PED 108 for receiving tokens).

At S210, endpoint 106 may decode the received token according to decoding instructions received from ASP 116 (and/or alternatively from proximity verification component 118). Alternatively, endpoint 106 may send the received token to ASP 116 upon receipt without decoding the token.

At S212, ASP 116 receives a token that was sent from an endpoint 106, which in turn received the emitted token from PED 108. Reception of a token by ASP 116 may constitute an application service request. For instance, endpoint 106 could receive an emitted token from PED 108 at the gate to a secure area. The service request to ASP 116 would then be part of an access request to enter the secure area.

At S214, ASP 116 determines if the received token corresponds to an application provided by ASP 116. Tokens may be checked for correspondence within ASP 116 based on for example, prefix of IP addresses associated with ASP 116. For example, if a packet that includes the token is received at ASP 116 has a prefix corresponding to ASP 116, ASP 116 determines that the packet is to be processed by ASP 116. If a packet prefix indicates that the packet is not be processed by ASP 116 but instead by another ASP, ASP 116 may either directly forward the packet that includes the token to the appropriate ASP or may forward it to a central controller/processors (not shown in FIG. 1) that keeps a database of correspondence between various ASPs and can forward the packet to the correct ASP.

If at S214, ASP 116 determines that the received token does not correspond to an application provided by ASP 116, then at S216 ASP 116 may forward the received token to another ASP 116, if possible and appropriate, to a central controller/processor for forwarding (as described above), or it may simply drop the service request. Applications can be configured to allow for many possible responses. For instance, a service request to access a secure area may be dropped if the token does not correspond to an application provided by ASP 116 due to the security specifications of the application.

Thereafter and optionally at S2118, ASP 116 notifies endpoint 106 that the received token has been either forwarded to another ASP 116 or that the service request has been dropped.

Referring back to S214, if at S214 ASP 116 determines that the received token corresponds to an application provided by ASP 116, then at S220, ASP 116 communicates with proximity validation component 118 to determine if the received token is valid. Validation at least consists of checking that the token's validation period is still open and/or if the decoded token corresponds to a valid token number issued to PED 108 by proximity verification component 118.

If validated at S220, then at S222, ASP 116 records the location and time of endpoint 106. In one example, every time endpoint 106 transmits a received token to ASP 116, such token has an associated timestamp and identification of a PED 108 that has emitted the token. Therefore, location and time of presence of endpoint 106 at such location can be derived from timestamp information associated with the received token and location information associated with PED 108 that emitted the token.

At S224, ASP 116 allows endpoint 106 access to the requested application. For instance, ASP 116 could allow user 104 to use the service (e.g., access to the secure area).

Referring back to S220, if the token is not validated by proximity verification component 118, then at S226 ASP 116 denies endpoint 106 access to the application and informs endpoint 106 of this denial of service. In one example, a reason for denial of access may be that the attempted validation took place outside the token's validation period, but this is not the only possible reason for an invalid token.

With an example method described with reference to FIG. 2, the disclosure now describes two non-limiting examples of applying method of FIG. 2.

In one example, an application installed on endpoint 106 may provide a service that proves endpoint 106 is at a specific location at a specific time with high certainty. This service and the corresponding application may be provided to endpoint 106 by ASP 116. Such service may have customized instructions based on which tokens have been generated and provided to PED 108 for emission. Example instructions may include, but are not limited to, a range/distance within which endpoint 106 must be in order to detect an emitted token, a duration of validity of each token, a frequency with which PED 108 is to emit the tokens, etc. According to the instructions, PED 108 emits a token with a short latency period (e.g. every few seconds), which endpoint 106 may detect once within the required range of PED 108. Endpoint 106 may, based on instructions received from ASP 116, decode the received token followed by sending the decoded token to ASP 116 for validation. Alternatively, endpoint 106 may send the un-decoded token to ASP 116 to be decoded and validated. Upon receiving the token, ASP 116 determines that the token corresponds to a relevant application (e.g., by analyzing preamble information of a packet with which the token was received). If ASP 116 determines that the token does not correspond to a service it provides, ASP 116 may either forward the token to an appropriate ASP or may send the same to a central processor that manages ASPs to determine which ASP the token should be sent to.

However, if ASP 116 determines that the token corresponding to a relevant application it provides, ASP 116 then sends the token to proximity validation component 118 to be validated. proximity validation component 118 may identify the token as being allocated to PED 108 and emitted in a specific time window and thus valid. If token is not validated, proximity validation component 118 may inform ASP 116 accordingly, which may in turn notify endpoint 106 that the token is invalid and the corresponding service is denied (e.g., access to a secure area is denied). However, once the token is validated, proximity validation component 118 notifies ASP 116 of the validation, in response to which ASP 116 records location and time information associated with the emitted token. This time and location information may be used to prove that endpoint 106 was at or near PED 108 at a corresponding recorded time. In response to this information, ASP 116 may allow further action such as allowing endpoint 106 and user 104 access to a secure area, etc.

In one variation of the above example and in order to further bolster the certainty of proving endpoint 106 was at or near (proximal to) PED 108 at a specific time, ASP 116, upon receiving the first token and validation thereof, may wait to receive a second token to conclude with high certainty that endpoint 106 is proximal to PED 108 at this point in time.

Another example application of method of FIG. 2 is a service that proves endpoint 106 is within a certain distance of PED 108. A token may be generated, emitted by PED 108, received (and/or optionally decoded) by endpoint 106, transmitted to ASP 116, validated by proximity verification component 118, all as described above. Upon validation, ASP 116, knowing the location of PED 108, ASP 116 can determine that endpoint 106 is within a certain distance of PED 108 (where the exact distance is determined based on the instructions according to which the token was generated and is a configurable parameter determined based on experiments and/or empirical studies).

Figure 3:
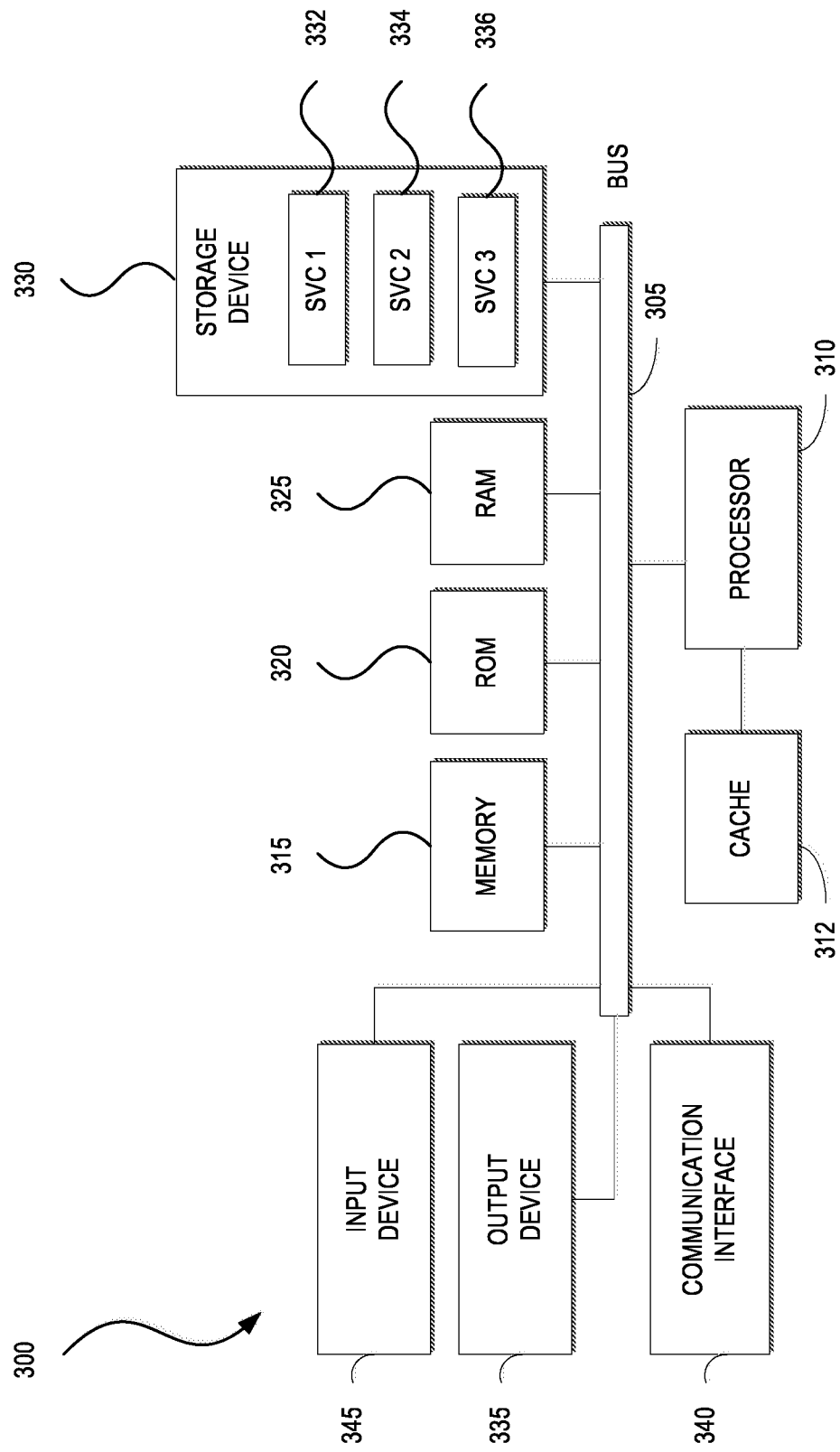
FIG. 3 illustrates an example system architecture, according to an aspect of the present disclosure.

With above example embodiments of a heterogeneous network of independently provided system components and methods for detecting and verifying time and location information of endpoints described above, the disclosure now turns to describing example components and systems that may be implemented as any one of endpoint 106, PED 108, PED provider 112, proximity service provider 114, ASP 116 and/or proximity verification component 118. FIG. 3 illustrates an example system architecture, according to an aspect of the present disclosure.

FIG. 3 illustrates an example of a bus computing system 300 wherein the components of the system are in electrical communication with each other using a bus 305. The computing system 300 can include a processing unit (CPU or processor) 310 and a system bus 305 that may couple various system components including the system memory 315, such as read only memory (ROM) 320 and random access memory (RAM) 325, to the processor 310. The computing system 300 can include a cache 312 of high-speed memory connected directly with, in close proximity to, or integrated as part of the processor 310. The computing system 300 can copy data from the memory 315, ROM 320, RAM 325, and/or storage device 330 to the cache 312 for quick access by the processor 310. In this way, the cache 312 can provide a performance boost that avoids processor delays while waiting for data. These and other modules can control the processor 310 to perform various actions. Other system memory 315 may be available for use as well. The memory 315 can include multiple different types of memory with different performance characteristics. The processor 310 can include any general purpose processor and a hardware module or software module, such as SERVICE (SVC) 1 332, SERVICE (SVC) 2 334, and SERVICE(SVC) 3 336 stored in the storage device 330, configured to control the processor 310 as well as a special-purpose processor where software instructions are incorporated into the actual processor design. The processor 310 may essentially be a completely self-contained computing system, containing multiple cores or processors, a bus, memory controller, cache, etc. A multi-core processor may be symmetric or asymmetric.

To enable user interaction with the computing system 300, an input device 345 can represent any number of input mechanisms, such as a microphone for speech, a touch-protected screen for gesture or graphical input, keyboard, mouse, motion input, speech and so forth. An output device 335 can also be one or more of a number of output mechanisms known to those of skill in the art. In some instances, multimodal systems can enable a user to provide multiple types of input to communicate with the computing system 300. The communications interface 340 can govern and manage the user input and system output. There may be no restriction on operating on any particular hardware arrangement and therefore the basic features here may easily be substituted for improved hardware or firmware arrangements as they are developed.

The storage device 330 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 330 can include the software services 332, 334, 336 for controlling the processor 310. Other hardware or software modules are contemplated. The storage device 330 can be connected to the system bus 305. In some embodiments, a hardware module that performs a particular function can include a software component stored in a computer-readable medium in connection with the necessary hardware components, such as the processor 310, bus 305, output device 335, and so forth, to carry out the function.

Figure 4:
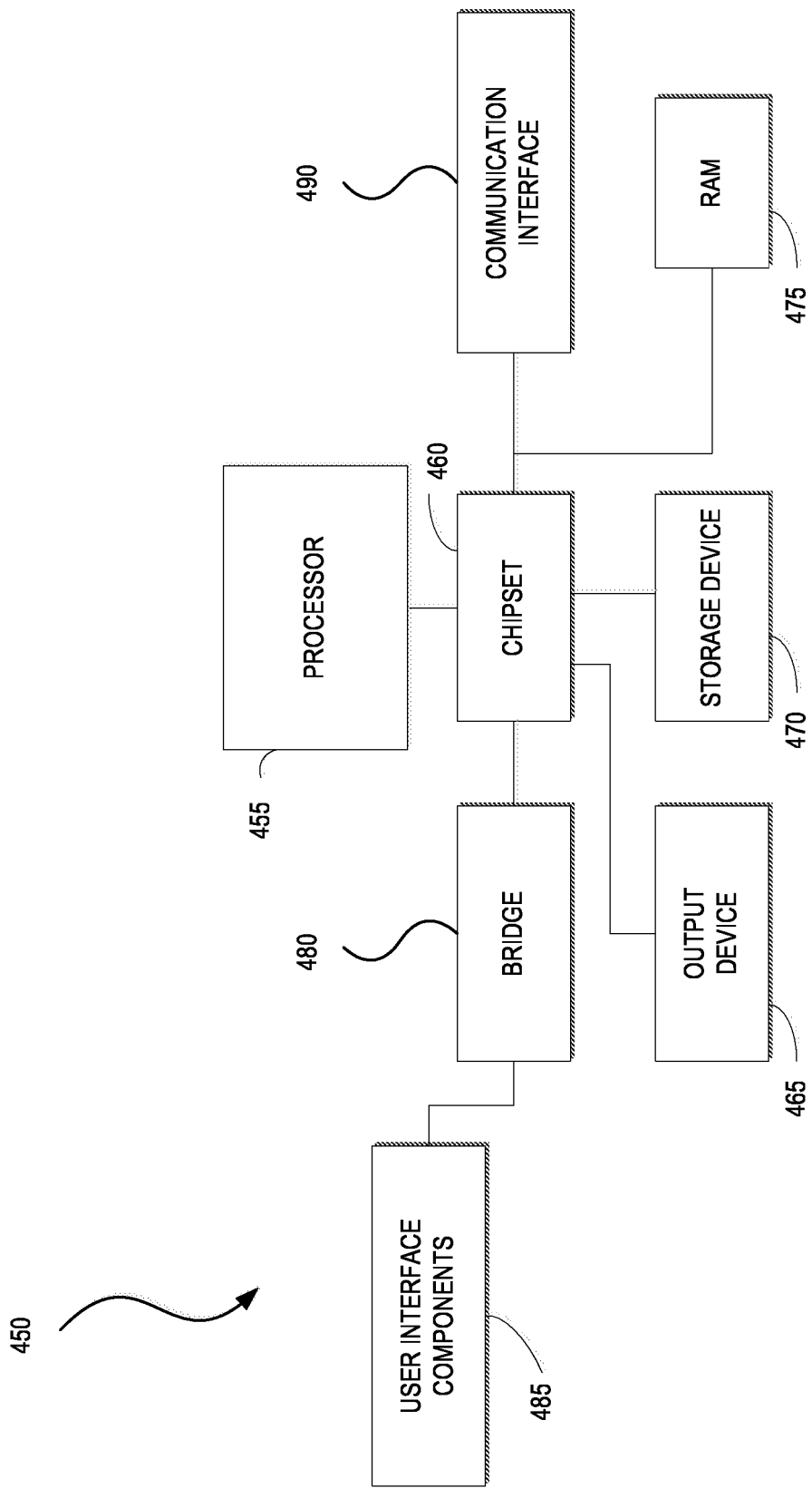
FIG. 4. illustrates an example system architecture, according to an aspect of the present disclosure.

FIG. 4. illustrates an example system architecture, according to an aspect of the present disclosure.

FIG. 4 illustrates an example architecture for a chipset computing system 450 that can be used in accordance with an embodiment. The computing system 450 can include a processor 455, representative of any number of physically and/or logically distinct resources capable of executing software, firmware, and hardware configured to perform identified computations. The processor 455 can communicate with a chipset 460 that can control input to and output from the processor 455. In this example, the chipset 460 can output information to an output device 465, such as a display, and can read and write information to storage device 470, which can include magnetic media, solid state media, and other suitable storage media. The chipset 460 can also read data from and write data to RAM 475. A bridge 480 for interfacing with a variety of user interface components 485 can be provided for interfacing with the chipset 460. The user interface components 485 can include a keyboard, a microphone, touch detection and processing circuitry, a pointing device, such as a mouse, and so on. Inputs to the computing system 450 can come from any of a variety of sources, machine generated and/or human generated.

The chipset 460 can also interface with one or more communication interfaces 490 that can have different physical interfaces. The communication interfaces 490 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 455 analyzing data stored in the storage device 470 or the RAM 475. Further, the computing system 450 can receive inputs from a user via the user interface components 485 and execute appropriate functions, such as browsing functions by interpreting these inputs using the processor 455.

It will be appreciated that computing systems 300 and 450 can have more than one processor 310 and 455, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
 receiving, at a first network component and from a second network component, a set of instructions for generating tokens in association with an application service provided by the second network component, wherein the set of instructions for generating tokens comprises one or more parameters associated with the tokens, the one or more parameters being based on a type of application service of the application service, wherein the set of instructions comprises different instructions associated with different secure locations, each of the different instructions corresponding to a different secure location of the different secure locations;
 generating, at the first network component, the tokens based on the set of instructions;
 transmitting, by the first network component and according to the set of instructions, one or more of the tokens to one or more proximity emitter devices;
 receiving, from the second network component, a message including a token received by a user device from at least one of the one or more proximity emitter devices, wherein receiving the message from the second network component is based on a determination by the second network component that the token corresponds to the application service provided by the second network component, wherein the token is associated with at least one of the different instructions associated with the different secure locations;
 validating, by the first network component, the token, wherein the validating comprises a confirmation that the token is from among the tokens generated by the first network component; and
 providing, to the second network component, a validation result that enables the second network component to determine whether to allow the user device access to the application service.

2. The method of claim 1, wherein the set of instructions comprises:
 security requirements of the application; and
 a validation period of each generated token.

3. The method of claim 1, wherein the first network component is a proximity verification component and the second network component is an application service provider providing the application service to the user device.

4. The method of claim 1, further comprising:
 receiving, from a third network component, specifications for generating associated tokens; and
 generating the associated tokens using the set of instructions and the specifications, the third network component being external to and independent of the first network component.

5. The method of claim 1, wherein the set of instructions for generating tokens further comprises a minimum distance required between the one or more proximity emitter devices and the user device.

6. The method of claim 1, further comprising:
 receiving, at the first network component, multiple sets of instructions for creating respective tokens for multiple application services;
 generating, by the first network component, the respective tokens for each of the multiple application services based on a corresponding set of the multiple sets of instructions.

7. The method of claim 6, further comprising validating each received token against the respective tokens associated with a corresponding one of the multiple application services wherein the set of instructions comprises different instructions associated with different secure locations, each of the different instructions corresponding to a different secure location of the different secure locations, wherein the token is associated with at least one of the different instructions associated with the different secure locations.

8. A system comprising:
 one or more processors;
 at least one non-transitory computer-readable medium having stored thereon instructions which, when executed by the one or more processors, cause the one or more processors to:
  receive, from an application service provider, a set of instructions for generating tokens in association with an application service, wherein the set of instructions for generating tokens comprises one or more parameters associated with the tokens, the one or more parameters being based on a type of application service of the application service, wherein the set of instructions comprises different instructions associated with different secure locations, each of the different instructions corresponding to a different secure location of the different secure locations;
  generate the tokens based on the set of instructions;
  transmit, according to the set of instructions, one or more of the tokens to the one or more proximity emitter devices;
  receive, from the application service provider, a message including a token received by a user device from at least one of the one or more proximity emitter devices, wherein receiving the message from the application service provider is based on a determination by the application service provider that the token corresponds to the application service provided by the application service provider, wherein the token is associated with at least one of the different instructions associated with the different secure locations;
  validate the token, wherein the validating comprises a confirmation that the token is from among the tokens generated by the network component; and
  provide a result of the validation to the application service provider to enable the application service provider to determine whether to allow the user device access to the application service.

9. The system of claim 8, wherein the set of instructions further comprises:
  security requirements of the application; and
  a validation period of each generated token.

10. The system of claim 8, further comprising a network component associated with the one or more processors, wherein the network component is a proximity verification component communicatively coupled to the application service provider providing the application service to the user device.

11. The system of claim 8, the at least one non-transitory computer-readable medium having stored thereon instructions which, when executed by the one or more processors, cause the one or more processors to:
  receive specifications for generating associated tokens to the network component; and
  generate the associated tokens using the set of instructions and the specifications.

12. The system of claim 8, wherein the set of instructions for generating tokens further comprises a minimum distance required between the one or more proximity emitter devices and the user device.

13. The system of claim 8, the at least one non-transitory computer-readable medium having stored thereon instructions which, when executed by the one or more processors, cause the one or more processors to:
  receive multiple sets of instructions for creating respective tokens for multiple application services;
  generate the respective tokens for each of the multiple application services based on a corresponding set of the multiple sets of instructions.

14. The system of claim 13, the at least one non-transitory computer-readable medium having stored thereon instructions which, when executed by the one or more processors, cause the one or more processors to validate each received token against the respective tokens associated with a corresponding one of the multiple application services wherein the set of instructions comprises different instructions associated with different secure locations, each of the different instructions corresponding to a different secure location of the different secure locations, wherein the token is associated with at least one of the different instructions associated with the different secure locations.

15. One or more non-transitory computer-readable media comprising computer-readable instructions, which when executed by one or more processors of a first network component, cause the first network component to:
  receive, from a second network component, a set of instructions for generating tokens in association with an application service provided by the second network component, wherein the set of instructions for generating tokens comprises one or more parameters associated with the tokens, the one or more parameters being based on a type of application service of the application service, wherein the set of instructions comprises different instructions associated with different secure locations, each of the different instructions corresponding to a different secure location of the different secure locations;
  generate the tokens based on the set of instructions;
  generate, according to the set of instructions, one or more of the tokens to one or more proximity emitter devices;
  receive, from the second network component, a message including a token received by a user device from at least one of the one or more proximity emitter devices, wherein receiving the message from the second network component is based on a determination by the second network component that the token corresponds to the application service provided by the second network component, wherein the token is associated with at least one of the different instructions associated with the different secure locations;
  validate the token to confirm that the token is from among the tokens generated by the network component; and
  provide a result of the validation to the second network component to enable the second network component to determine whether to allow the user device access to the application service the validation allowing the user device access to the application service.

16. The one or more non-transitory computer-readable media of claim 15, wherein the set of instructions comprises:
  security requirements of the application; and
  a validation period of each generated token.

17. The one or more non-transitory computer-readable media of claim 15, wherein the first network component is a proximity verification component and the second network component is an application service provider providing the application service to the user device.

18. The one or more non-transitory computer-readable media of claim 15, wherein the execution of the computer-readable instructions by the one or more processors further cause the first network component to:
  receive, from a third network component, specifications for generation of associated tokens; and
  generate the associated tokens using the set of instructions and the specifications, the third network component being external to and independent of the first network component.

19. The one or more non-transitory computer-readable media of claim 15, wherein the set of instructions for generating tokens further comprises a minimum distance required between the one or more proximity emitter devices and the user device.

20. The one or more non-transitory computer-readable media of claim 15, wherein the execution of the computer-readable instructions by the one or more processors further cause the first network component to:
  receive multiple sets of instructions for creating respective tokens for multiple application services;
  generate the respective tokens for each of the multiple application services based on a corresponding set of the multiple sets of instructions; and
  validate each received token against the respective tokens associated with a corresponding one of the multiple application services.

* * * * *